(12) United States Patent
Robbins

(10) Patent No.: US 7,104,351 B2
(45) Date of Patent: Sep. 12, 2006

(54) MOUNT FOR CHAIN DRIVEN SPROCKET AND CHAIN POWERED SCOOTER

(75) Inventor: Jim Robbins, San Francisco, CA (US)

(73) Assignee: Patmont Motor Werks Inc., Minden, NV (US)

( * ) Notice: Subject to any disclaimer, the term of this patent is extended or adjusted under 35 U.S.C. 154(b) by 145 days.

(21) Appl. No.: 10/860,896

(22) Filed: Jun. 3, 2004

(65) Prior Publication Data

US 2005/0269144 A1 Dec. 8, 2005

(51) Int. Cl.
*A63C 17/12* (2006.01)

(52) U.S. Cl. .................. 180/181; 180/220; 280/87.041

(58) Field of Classification Search ............. 280/87.01, 280/87.041; 180/180, 181, 350, 351, 357, 180/65.1, 218, 220, 228
See application file for complete search history.

(56) References Cited

U.S. PATENT DOCUMENTS

| | | | | |
|---|---|---|---|---|
| 4,094,372 A * | 6/1978 | Notter | ......................... | 180/181 |
| 5,020,621 A * | 6/1991 | Martin | ......................... | 180/181 |
| 5,718,534 A * | 2/1998 | Neuling | ......................... | 404/94 |
| 5,826,674 A * | 10/1998 | Taylor | ......................... | 180/219 |
| 5,893,425 A * | 4/1999 | Finkle | ......................... | 180/181 |
| 5,894,898 A * | 4/1999 | Catto | ......................... | 180/2.2 |
| 6,345,678 B1 * | 2/2002 | Chang | ......................... | 180/181 |
| 6,435,290 B1 * | 8/2002 | Justus et al. | ................ | 180/9.1 |
| 6,457,544 B1 * | 10/2002 | Sung | ......................... | 180/220 |
| 6,564,894 B1 * | 5/2003 | Ho | ......................... | 180/228 |
| 6,752,229 B1 * | 6/2004 | Ho | ......................... | 180/181 |
| 6,830,255 B1 * | 12/2004 | Cheng | .................. | 280/87.041 |
| 6,889,784 B1 * | 5/2005 | Troll | ......................... | 180/13 |

* cited by examiner

*Primary Examiner*—Christopher Ellis
*Assistant Examiner*—Brian Swenson
(74) *Attorney, Agent, or Firm*—Townsend and Townsend and Crew LLP

(57) ABSTRACT

An improved motor mount adjustably tensions the chain in a chain and sprocket driven vehicle. The vehicle has a frame, at least one driven wheel rotating from a wheel rotation point on the frame, a driven sprocket driving the driven wheel. A motor is mounted to the frame and has a driving sprocket at a motor sprocket rotation point on the motor. The driving sprocket is disposed in a plane including the driven sprocket, and powers a chain. An improved mount for mounting the motor from the frame relative to the driven sprocket includes a motor mount for fastening to the engine for disposing the driving sprocket from the engine overlying the driven sprocket powering the driven wheel. A motor mount pivot is provided on the motor mount for pivoting the driving sprocket along the plane including the chain and driven sprocket. A keeper slot is configured within the motor mount, the keeper slot being coaxial about the pivot to enable a keeper to slide relative to the keeper slot during pivot of the motor mount.

11 Claims, 6 Drawing Sheets

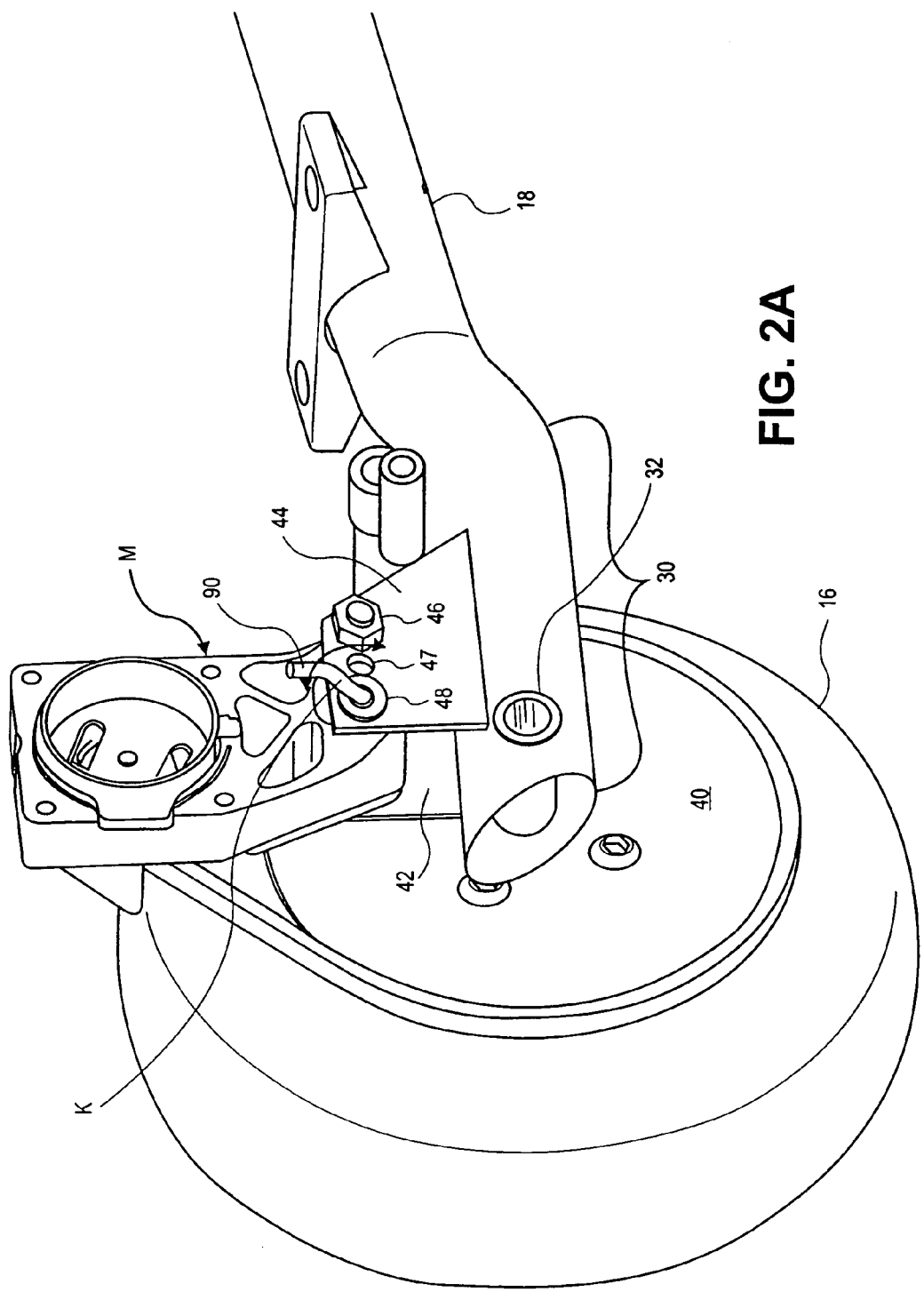

MOUNT FOR CHAIN DRIVEN SPROCKET AND CHAIN POWERED SCOOTER

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING ETC.

Not applicable

This invention relates to a motor mount for a sprocket and chain transmission system for small all-terrain vehicles, such as motorized scooters or motorized carts. More particularly, the motor mount cooperates with a motor powering a chain drive which effects high reduction between a high-speed, low-horsepower motor attached to the mount and a relatively slower speed, driven ground-engaging wheel.

BACKGROUND OF THE INVENTION

Motor driven scooters have had drives direct from a motor driven rotating shaft onto a driven wheel. Such drives give the driven wheel two points of wear. First, the driven wheel wears at its area of contact with the ground. Secondly, the driven wheel wears at the driving shaft. More importantly, the interaction between the driven wheel and the driving shaft is not positive. Slippage with accompanying friction losses make such transmissions less than optimal. For that reason, motor driven scooters and other small vehicles for the most part now rely upon sprocket and chain drives.

Unfortunately, chain drives for small all-terrain vehicles, such as scooters and go carts, are replete with problems. First, such vehicles operate in a dirt and mud environment. The resultant ambient grit produces high chain wear with resultant chain lengthening.

Second, chain lengthening due to chain wear can be easily understood. In the case of a chain having 94 links, chain wear for each link will occur at three separate places. First, each link is held together by a link pin. As the pin diameter decreases due to wear, the overall length of the link will increase in each chain direction by the amount of the wear. Second, each chain link includes forward-extending links and rearward-extending links. Each of these respective forward-extending and rearward-extending links fastens to the link pin at an aperture. Each of these apertures is subject to wear, especially in the grit environment. Each aperture as it is subject to wear becomes an individual contributor to chain lengthening. Because there are two apertures for each pin at each link, the chain wear at each aperture will contribute to chain lengthening. Thus, in the chain having 94 links, there are additively 94 pins and 188 apertures all subject to wear. Each wear point, being a pin or an aperture, lengthens the chain. Presuming that the small all-terrain vehicles are continually operated in a grit environment, adjustment for chain length change becomes an ongoing proposition.

A rapidly lengthening chain on a small all-terrain vehicle increases the probability of chain and sprocket derailment. Generally speaking, the smaller the chain, the more rapid the wear. The operator of the small all-terrain vehicle has an interest in maintaining proper chain tension.

It is known to use mechanical tensioning devices in such environments. However, such conventional mechanical tensioners require pivot points, spring bias, and chain idlers. They impose a considerable complication on a chain and sprocket drive. In the case of a small all-terrain vehicle, further complication of mechanical tensioning devices is disadvantageous, especially in the limited space available between the driving low-horsepower, high-speed motor and the sprocket-driven small-diameter ground-engaging wheel.

Small all-terrain vehicles typically use low-horsepower, high-speed motors. For example, in the scooter which forms a preferred example of this invention, a 2-½ horsepower 8000 rpm motor is used. This motor is used to drive wheels in the order of eight to nine inches. Rotation reduction is a key transmission system issue.

At the same time, small all-terrain vehicles place high dynamic loading on their transmissions. For example, where the wheels of such vehicles temporarily leave the ground and become airborne, return of the powered wheel to the ground normally produces high dynamic shock loads on the transmission system. As a result, many chain transmission systems have tried using chain sizes that can withstand the high dynamic shock loads. Unfortunately, with increased chain size, sprocket size and sprocket inertia increases. Increased sprocket size necessitates the use of a larger transmission system, requires the use of intermediate so-called idler or "jack" shafts, and increases transmission inertia, inhibiting acceleration and deceleration.

Intermediate idler or "jack" shafts present an especially undesired complication to chain and sprocket transmission systems for small all-terrain vehicles. In such idler or jack shafts systems, a first chain loops the high-speed drive sprocket at the low-horsepower motor to a second driven sprocket on the idler or jack shaft. A second chain loops the third drive sprocket on the idler or jack shaft and extends to a fourth driven sprocket at the small ground-engaging wheel. The additional mechanical parts of the idler or jack shaft and two sprockets, the additional second chain, the complexity of mounting the idler or jack shaft and the two sprockets, and the space required for such idler or jack shaft and two sprockets are generally unsuitable for small all-terrain vehicle chain transmissions.

Presuming that one wishes to use a small-size chain and sprocket drive for an all-terrain vehicle, the load limits of such small chains also become a problem. For example, a No. 25 chain has a tensile load limit in the order of 900 pounds (compared to the 2500-pound tensile load limit of the No. 35 chain). With normally available chain and sprocket transmissions, a lighter chain realizes greater probability of chain failure.

Finally, and presuming that one is going to use a small chain for such an all-terrain vehicle high-reduction chain and sprocket transmission, the transmission of power from a small high-speed sprocket to the small chain presents a power transmission issue. By definition, a small-diameter sprocket contacts the chain at a small number of lugs. In the typical chain and lug scooter drive, the total power of the engine is delivered to a small chain at a reduced number of lugs. The probability of lug failure and/or chain link failure increases directly proportional to the increased power transfer at each sprocket lug to each chain link.

We have utilized a chain keeper pivoting over a small driving sprocket as a chain tensioning apparatus. This chain keeper has a chain-contacting tongue elastically biased with respect to the keeper toward the inside of the chain loop. The chain-contacting tongue contacts and tensions the chain at the idle chain linkage between the small driving sprocket and the large driven sprocket. The chain keeper is a one-piece construction, preferably molded from a high-impact, wear-resistant, low-chain-slide-friction plastic material. This molded chain keeper has a chain-contacting tongue elastically biased to the slack side of the chain.

Vehicles driven by chain and sprocket drives typically have their motors rigidly mounted to the vehicle. The driven wheel and driven sprocket are typically adjustably mounted relative to the vehicle and thus adjustably mounted relative to the motor and driving sprocket. When chain elongation occurs, it is the wheel which is moved relative to the motor to provide the adjustment. Thus, the entire support of the wheel at the frame is changed as the chain elongates. And when the chain is replaced, movement of the wheel is repeated as the new chain wears. Typically, such mounts must be of the "fork type." That is to say, the wheel is supported at both sides on its adjustable support. This double sided support of the wheel enables secure mounting of the wheel for supporting the weight of the scooter and rider when its position on the frame is changed.

Unfortunately, such adjustment of the wheel is incompatible with the modem tendency to provide single sided cantilever mounts for such driven wheels. Since the wheel is mounted on one side only, and not on both opposite sides, changing the position of the wheel relative to the motor is mechanically more complex.

Moreover, it will be understood that a driven wheel not only transmits the force required for the driving of the vehicle but additionally is loaded with the static and dynamic weight of the vehicle as it bears and impacts upon the ground. The adjustment of such a cantilevered wheel requires fastening of the wheel in its new position with sufficient support to resist both the dynamic forces occurring during driving of the scooter as well as the forces necessary to support of the vehicle. This firm type of mounting is at best difficult with a cantilever mount of the wheel.

Further, for such adjustment to occur, the vehicle must be supported free of the ground while the driving wheel is repositioned. This requires that the vehicle be held off the ground while repositioning of the wheel occurs. Simple, in the field adjustment, cannot occur. The scooter must be taken to a repair platform where the adjustment can occur.

BRIEF SUMMARY OF THE INVENTION

An improved motor mount adjustably tensions the chain in a chain and sprocket driven vehicle. The vehicle has a frame, at least one driven wheel rotating from a wheel rotation point on the frame, a driven sprocket driving the driven wheel. A motor is mounted to the frame and has a driving sprocket at a motor sprocket rotation point on the motor. The driving sprocket is disposed in a plane including the driven sprocket, and powers a chain. An improved mount for mounting the motor from the frame relative to the driven sprocket includes a motor mount for fastening to the engine for disposing the driving sprocket from the engine overlying the driven sprocket powering the driven wheel. A motor mount pivot is provided on the motor mount for pivoting the driving sprocket along the plane including the chain and driven sprocket. A keeper slot is configured within the motor mount, the keeper slot being coaxial about the pivot to enable a keeper to slide relative to the keeper slot during pivot of the motor mount. The chain has such a length that the frame pivot point on the vehicle frame is offset with respect to a line between the wheel rotation point of the driven wheel on the frame and the motor rotation point on the motor. This frame pivot point permits the motor mount to pivot with respect to the frame, whereby the distance between the wheel rotation point on the frame and the motor rotation point on the motor changes to correspondingly tension the chain during chain lengthening view to wear. A keeper mounted to the frame adjustably locks the keeper slot of the motor mount relative to the frame. This keeper enables locking the motor mount at a constant angle with respect to the frame pivot point to inhibit motor movement. Chain tension is adjustable through pivot and the keeper locking of the motor mount relative to the driven sprocket to change the distance between the driving sprocket of the motor and the driven sprocket at the wheel.

An advantage in this invention is that it is ideal for vehicles having cantilever driven wheels. Specifically, the motor mount and motor mount pivot can be mounted to a cantilever portion of the vehicle frame. The motor mount can in turn cantilever the driving sprocket into a plane including the driven sprocket of the cantilever driving wheel. The motor mount provides adjustable tensioning to the chain between the driven sprocket and the driving sprocket.

BRIEF DESCRIPTION OF THE DRAWINGS

FIG. 2A is a perspective view of the motor mount of this invention mounted to a frame having an offset portion for the cantilever mount of a driven wheel, the motor mount here being shown without the motor so that view of the driven sprocket mounted coaxial to the driven wheel is unobstructed, it being understood that the driving sprocket is hidden from view;

DETAILED DESCRIPTION OF THE INVENTION

Figure 1:
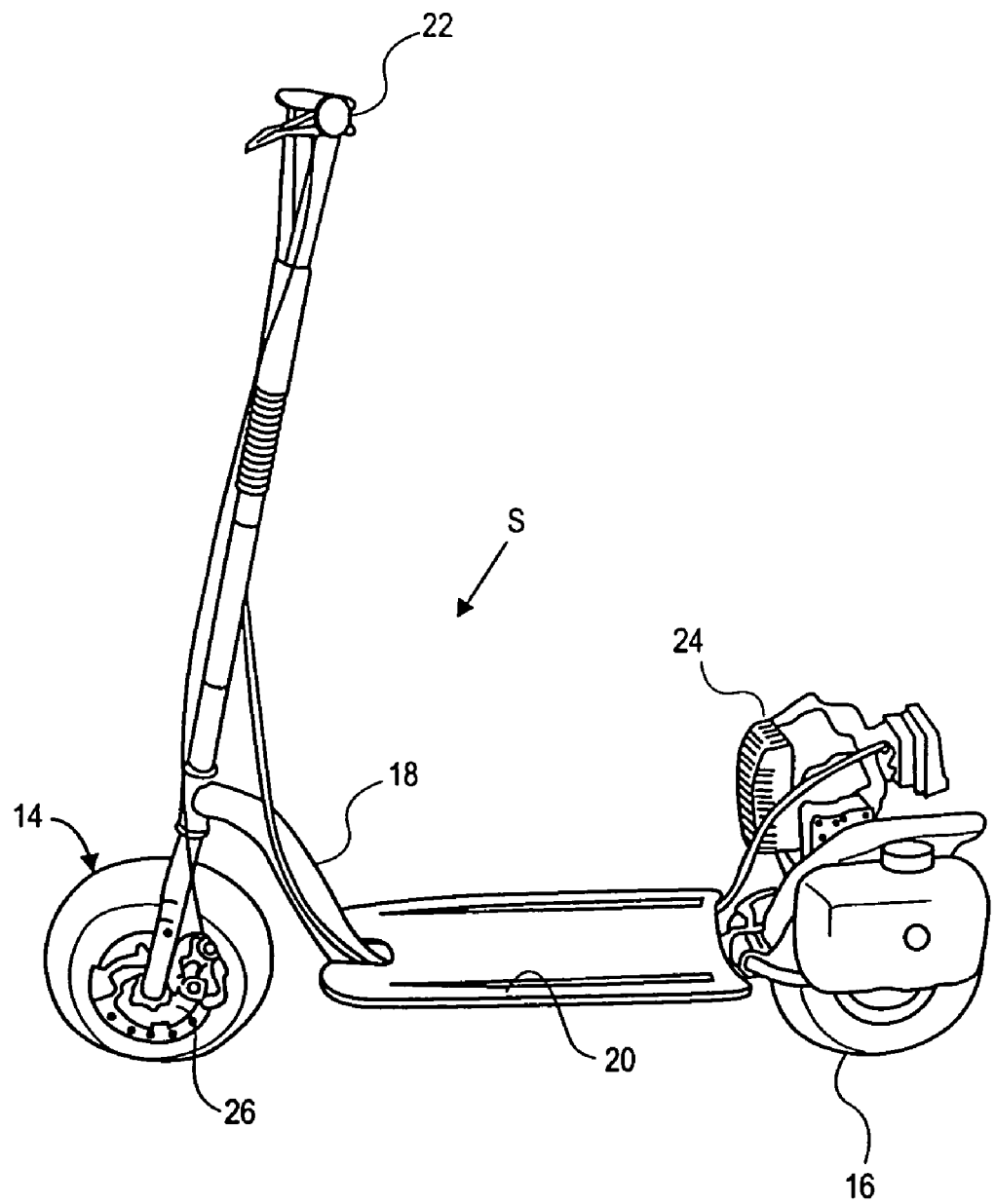
FIG. 1 is a perspective view of the scooter of this invention.

Referring to FIG. 1, scooter S is illustrated with front steered wheel 14, rear driven wheel 16, and main structural tube 18 extending between the two wheels. Platform 20 typically holds a standing rider (not shown) who directs scooter as at handle 22 by conventional steering and with throttle and brake controls controlling engine 24 and conventional front and rear disc brakes 26. As these controls are conventional and not particularly relevant to the this invention, they will not be further discussed herein.

Referring to FIG. 2A, a view is provided of the motor mount M, this view omitting engine 24 shown in FIG. 1. Main structural tube 18 is provided with an offset portion 30 from which rear driven wheel 16 is cantilevered. Cantilevered suspension occurs at cantilever mount 32 suspending driven wheel 16 substantially in-line with the main portion of structural tube 18. Between offset portion 32 and wheel 16, driven sprocket 40 is located. Driven sprocket 40 has a diameter which is a substantial fraction of the diameter of driven wheel 16. However, since driven sprocket 40 is immediately adjacent and juxtaposed to driven wheel 16, sprocket 40 has little chance of contact with the ground over which scooter S travels.

Paired mounting fins 42, 44 are welded to offset portion 30 and extend upwardly from offset portion 30. Fins 42, 44 are provided with a side-by-side spacing so as to snugly receive motor mount M. It will be understood that fins 42, 44 are cross bored with respective apertures 46, 47, and 48. As here shown, respective apertures 46 are the pivot point of mount M while apertures 48 allow keeper K to fastening mount M at a fixed angle relative to offset portion 30 of main structural tube 18.

Figure 2B:
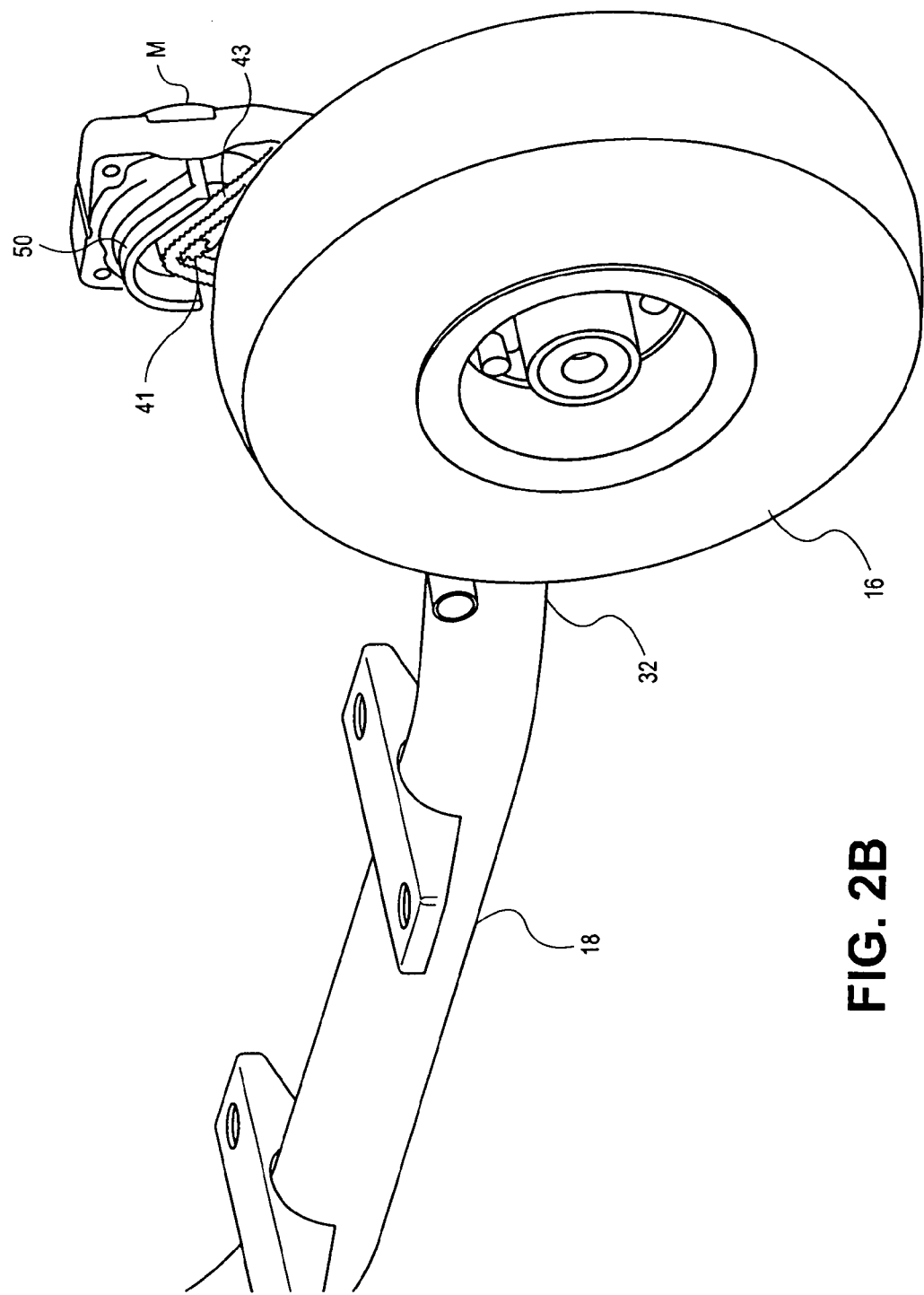
FIG. 2B is a perspective similar to FIG. 2A taken from the opposite side of the vehicle here illustrating the motor mount and driving sprocket protruding slightly above the driven wheel with the driven sprocket completely hidden from view.

Referring to FIG. 2B, driven wheel 16 is shown from the opposite side. Motor mount M is shown in the upper portion with engine 24 omitted and driven sprocket 41 powering chain 43. It will be seen that motor mount M has a small chain guard 50 overlying chain 43. Further, in this view, the cantilever mount of driven wheel 16 is clearly shown.

Figure 3A:
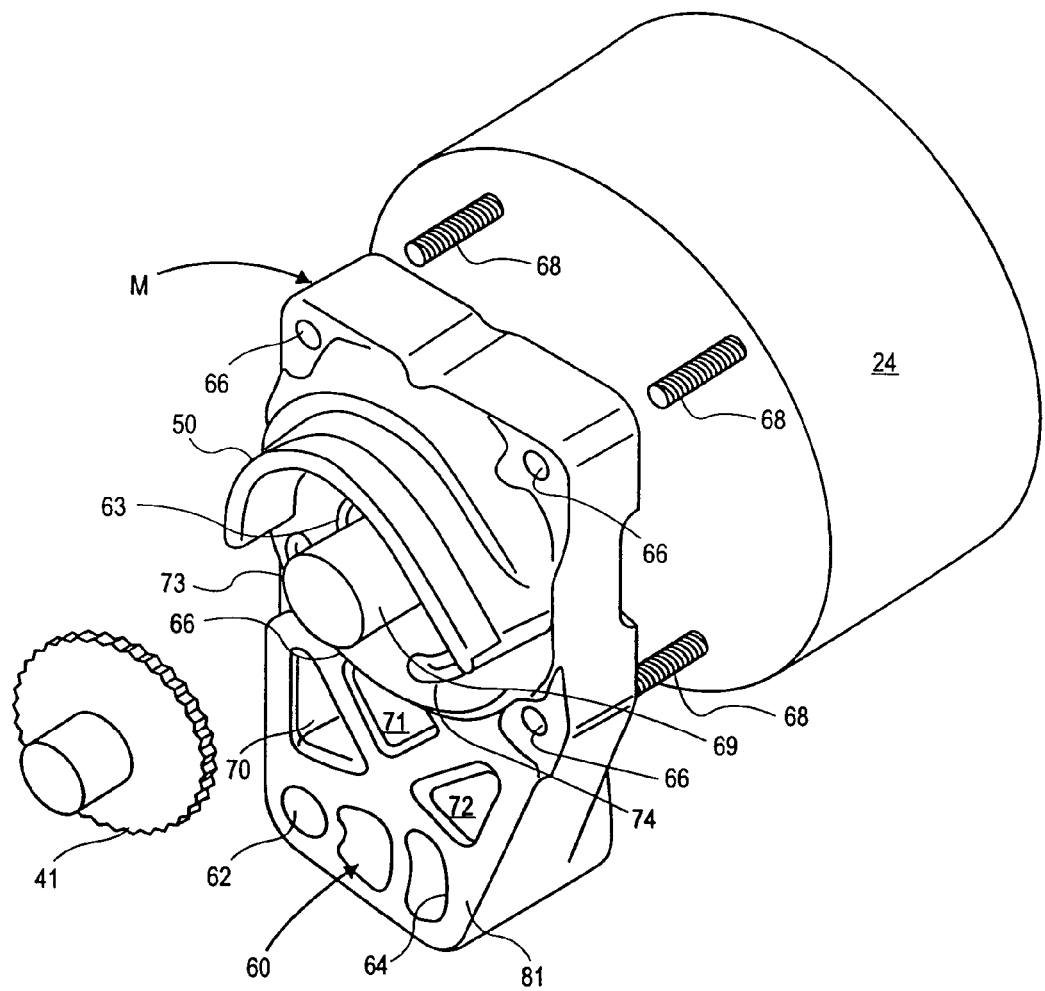
FIG. 3A is a perspective view of the motor mount of this invention with the motor shown in an exploded view to one side of the motor mount and the driving sprocket shown exploded view to the opposite side of the motor mount.

Referring to FIG. 3A, motor mount M is shown in perspective. Motor mount M constitutes a modem streamlined casting 60 having a pivot point 62 and keeper slot 64. Four screw mount apertures 66 accommodate mounting screws 68 extending from 24. Engine 24 mounts to engine mount M so as to dispose driven engine a shaft 69 centrally of a bore 63 through mount M. Once engine 24 is placed on mount M, driven sprocket 41 is fastened to and driven by shaft 66 of engine 24. Relief apertures 70-74 are provided interior of motor mount M. As is conventional, these apertures reduce weight while still providing the requisite strength to mount M.

Figure 3B:
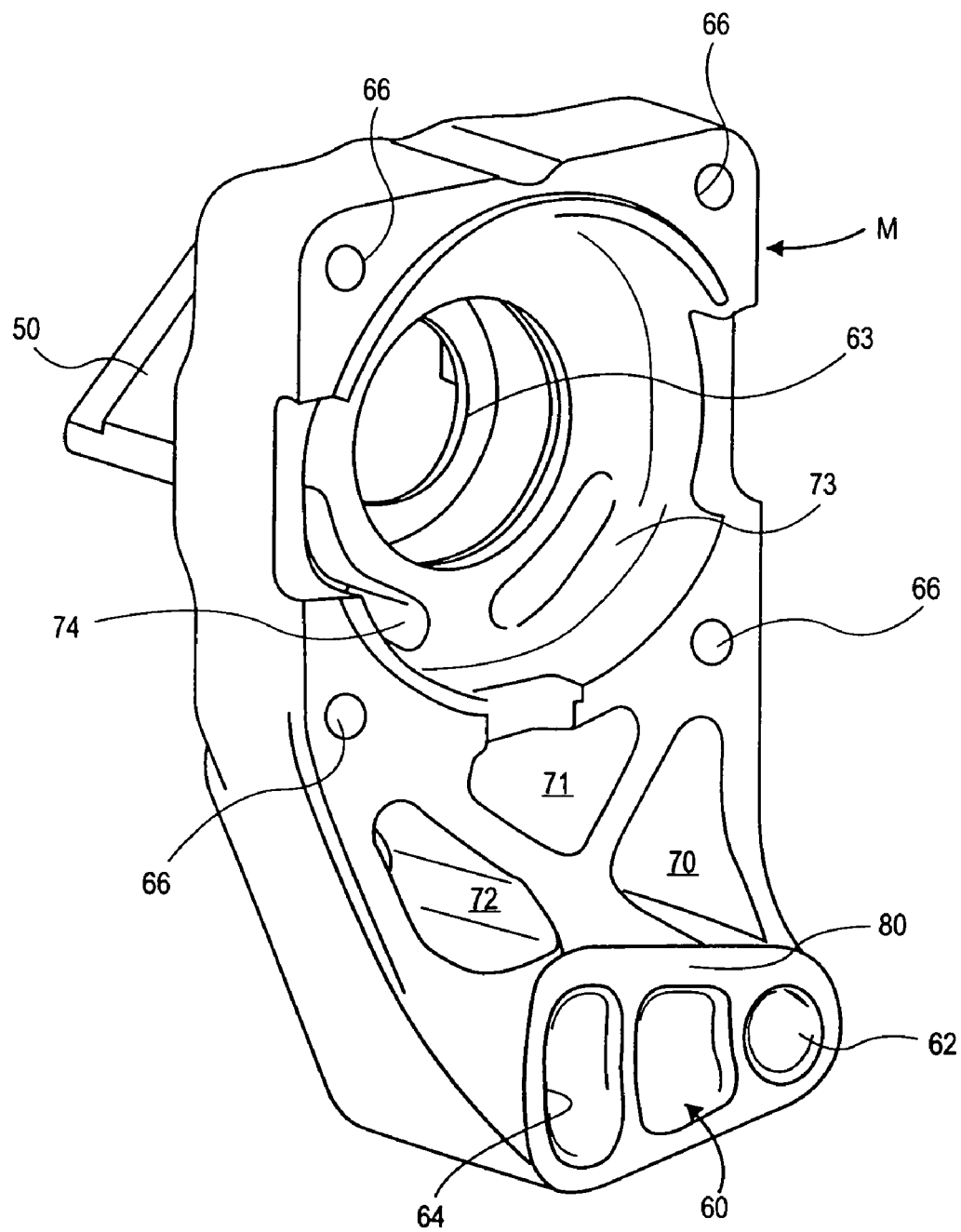
FIG. 3B is a perspective view of the motor mount taken from the opposite perspective of FIG. 3A with the motor and driving sprocket omitted; and, FIG. 4 is a side elevation view with the wheel omitted illustrating the motor mount and driving sprocket, the driven sprocket, and the chain length selected so as to maintain the pivot point of the motor mount offset with respect to a line taken between the centers of rotation or of the driving sprocket and the driven sprocket.

Referring to FIG. 3B, mount M is shown from the opposite side. In this view, engine 24 and driven sprocket 41 are omitted. Further, it is to be observed that mount M defines a flat surface 81 on both sides of mount M (see FIG. 3A). It will be understood that these surfaces confronts fins 42, 44, respectively. When keeper K is locked, mount M is maintained at a constant angle relative to offset portion 31 of main structural tube 18.

Figure 4:
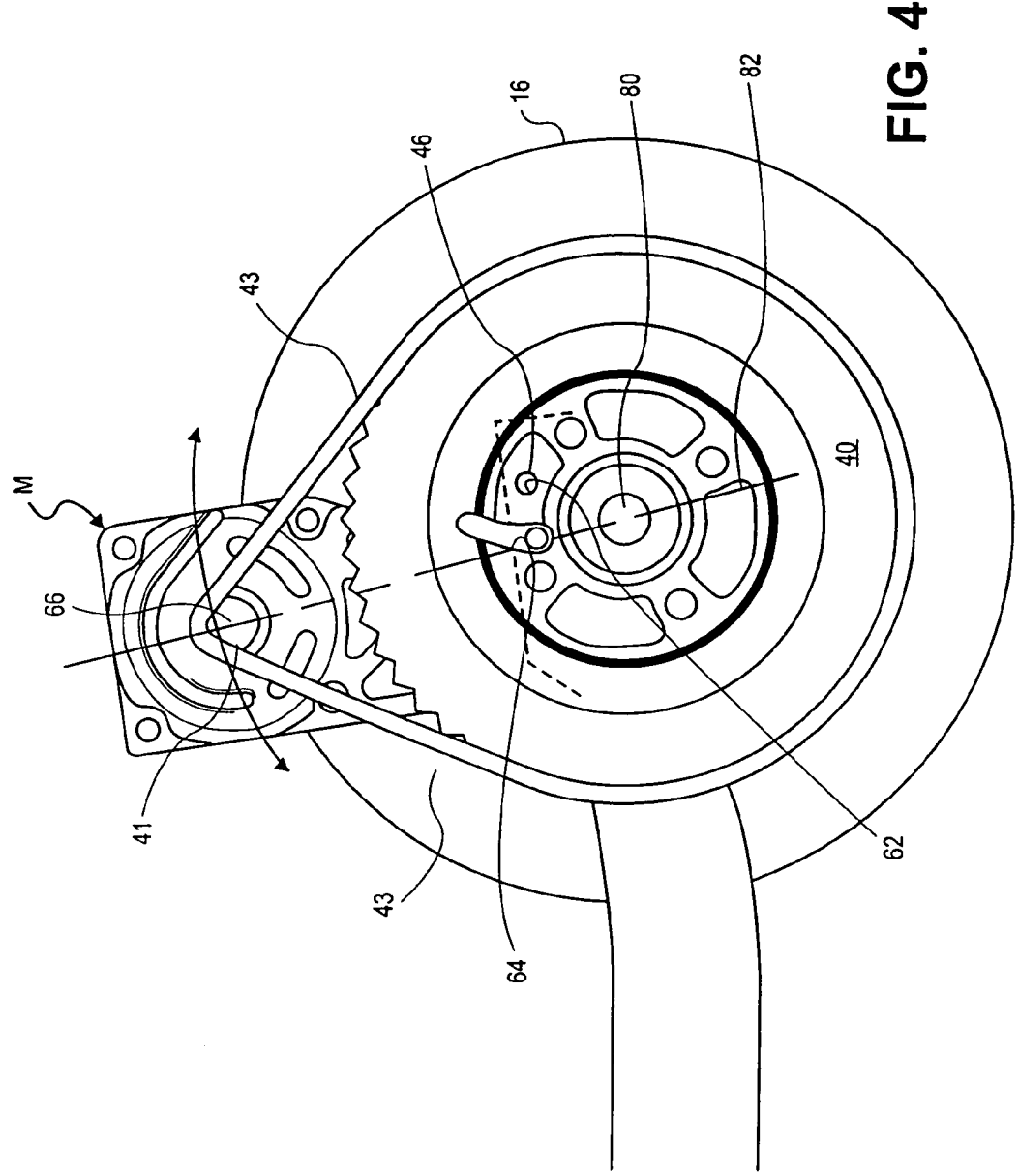

Referring to FIG. 4, the practical operation of mount M is illustrated. First, it will be seen that wheel 16 and driven sprocket 40 are both coaxial about axle 80. Second, driven shaft 66 and driven sprocket 41 are coaxial. A straight line 82 can be drawn between the respective centers of rotation of wheel 16 and driven shaft 66. It will be observed that pivot point 62 is not along this line and therefore is eccentric to axle 80. Specifically, chain 43 is given a length that restrains rotation of mount M so that line 82 never intersects pivot point 62 and apertures 46 at all points of reasonable elongation of chain 43. That is to say, driving sprocket 41 never passes top dead center of driven sprocket 40 due to the length of chain 43.

At the same time, the length of chain 43 is chosen so that it is at least near the top dead center rotation of driven sprocket 41 relative to line 82 and apertures 46 and pivot point 62. This enables mount M to pivot through a rather large distance to tension chain 43, causing relatively great adjustability of chain tension.

Keeper K is typically a keeper of the over center variety. Specifically, by manipulating toggled 90 (see FIG. 2A), locking of mount M at a relatively constant angle relative to offset portion 30 of main structural tube 18 can occur.

Operation is easy to understand. The rider of the scooter S, merely stops the scooter. Keeper K is released and motor 24 rotated forwardly to tension chain 43. When the chain is tensioned, keeper K is locked, and motor mount M is maintained in a constant angular position relative to offset portion 30 of main structural tube 18. As wear of chain 43 is gradual, interruptions for chain tensioning can usually be timed to be either at the beginning of scooter operation or at the end of scooter operation, for example between races.

Further, chain 43 can be dimensioned to fit around either engine 24 or driven wheel 16. With such a dimension, chain replacement is easy. Specifically, it is only necessary to slip in chain over either the engine or the driven wheel. Thereafter, through manipulation of mount M, tension on the chain can be relaxed. Thereafter, the chain can be fitted to the sprockets. Finally, manipulation of motor mount M can properly tension chain 43.

What is claimed is:

1. In a vehicle having,
a frame,
at least one driven wheel rotating from a wheel rotation point on the frame,
a driven sprocket driving the driven wheel rotating with the wheel from the wheel rotation point on the frame,
a motor mounted to the frame,
a driving sprocket mounted to a motor sprocket rotation point and powered for driving rotation, the driving sprocket disposed in a plane including the driven sprocket, and
a chain within the plane including the driving sprocket powered, the driven sprocket for driving the driven wheel,
an improved mount for mounting the motor from the frame relative to the driven sprocket comprising:
a motor mount for fastening to the motor for disposing the driving sprocket from the motor overlying the driven sprocket powering the driven wheel;
a motor mount pivot on the motor mount for pivoting the driving sprocket along the plane including the chain and driven sprocket;
a keeper slot mounted to the motor mount, the keeper slot coaxial about the pivot to enable a keeper to slide relative to the keeper slot during pivot of the motor mount about the motor mount pivot;
a motor mount pivot point on the vehicle frame for permitting the motor mount to be pivotally mounted to the frame, whereby upon pivot of the motor mount with respect to the frame the distance between the wheel rotation point on the frame and the motor rotation point on the motor changes to correspondingly change tension within the chain;
the chain dimensioned to maintain the motor mount pivot point offset with respect to a line between the wheel rotation point on the frame and the motor rotation point on the motor;
a keeper mounted to the frame for adjustably locking the keeper slot of the motor mount at a constant angle relative to the frame pivot point to inhibit keeper and/or motor movement,
whereby chain tension is adjustable through pivot of the motor mount at the motor mount a pivot relative to the driven sprocket to change the distance between the driving sprocket of the motor and the driven sprocket at the wheel bar.

2. The vehicle according to claim 1 and wherein:
the motor mount pivot point on the frame includes paired spaced apart flanges; and,
the keeper mounted to the frame for adjustably locking the keeper slot extends between the paired spaced apart flanges offset from the motor mount pivot point.

3. The vehicle according to claim 1 and wherein:
the motor mount includes a chain guard extending over the driving sprocket.

4. The vehicle according to claim 1 and wherein:
the motor mount includes relieving apertures for reducing the weight of the motor mount.

5. The vehicle according to claim 1 and wherein:
the motor mount includes a plurality of apertures for mounting to the motor at through bolts and a central aperture to permit a driving shaft of a motor to extend through the motor mount and power the driven sprocket.

6. In a scooter having,
a frame supporting a rider platform,
a front steered wheel mounted to the frame,
the frame defining a horizontally offset rear portion for cantilever mounting of a rear driven wheel;
a rear driven wheel rotating from a wheel rotation point on the offset rear portion of the frame,
a driven sprocket driving the driven wheel rotating with the wheel from the wheel rotation point on the frame,
a motor mounted to the frame,
a driving sprocket mounted to a motor sprocket rotation point and powered for driving rotation, the driving sprocket disposed in a plane including the driven sprocket, and
a chain within the plane including the driving sprocket powered, the driven sprocket for driving the driven wheel,
an improved mount for mounting the motor from the frame relative to the driven sprocket comprising:
a motor mount for fastening to the motor for disposing the driving sprocket from the motor overlying the driven sprocket powering the driven wheel;
a motor mount pivot on the motor mount for pivoting the driving sprocket along the plane including the chain and driven sprocket;
a keeper slot mounted to the motor mount, the keeper slot coaxial about the pivot to enable a keeper to slide relative to the keeper slot during pivot of the motor mount about the motor mount pivot;
a motor mount pivot point on the vehicle frame for permitting the motor mount to be pivotally mounted to the frame, whereby upon pivot of the motor mount with respect to the frame the distance between the wheel rotation point on the frame and the motor rotation point on the motor changes to correspondingly change tension within the chain;
the chain dimensioned to maintain the motor mount pivot point offset with respect to a line between the wheel rotation point on the frame and the motor rotation point on the motor;
a keeper mounted to the frame for adjustably locking the keeper slot of the motor mount at a constant angle will relative to the frame pivot point to inhibit motor movement,
whereby chain tension is adjustable through pivot of the motor mount at the motor mount a pivot relative to the driven sprocket to change the distance between the driving sprocket of the motor and the driven sprocket at the wheel.

7. The scooter in accordance with claim 6 and wherein:
the cantilevered wheel is mounted behind the frame supporting the rider platform.

8. The scooter in accordance with claim 6 and wherein:
the keeper includes an over center actuator for compressing the motor mount on the frame to angularly lock the motor mount with respect to the frame.

9. The scooter in accordance with claim 6 and wherein:
the motor mount to the motor mount at one side with the mass of the motor overlying the offset portion of the frame and the driving sprocket extending from the motor mount at an opposite side.

10. In a scooter having,
a frame supporting a rider platform,
a front steered wheel mounted to the frame,
the frame defining a horizontally offset rear portion for cantilever mounting of a rear driven wheel;
a rear driven wheel rotating from a wheel rotation point on the offset rear portion of the frame,
a driven sprocket driving the driven wheel rotating with the wheel from the wheel rotation point on the frame,
a motor mounted to the frame,
a driving sprocket mounted to a motor sprocket rotation point and powered for driving rotation, the driving sprocket disposed in a plane including the driven sprocket, and
a chain within the plane including the driving sprocket powered, the driven sprocket for driving the driven wheel,
a process of adjusting chain tension between the driving sprocket and the driven sprocket comprising the steps of:
providing a motor mount for fastening to the motor for disposing the driving sprocket from the motor overlying the driven sprocket powering the driven wheel;
providing a motor mount pivot on the motor mount for pivoting the driving sprocket along the plane including the chain and driven sprocket;
providing a keeper slot mounted to the motor mount, the keeper slot coaxial about the pivot to enable a keeper to slide relative to the keeper slot during pivot of the motor mount about the motor mount pivot;
pivoting the motor mount at a pivot point on the vehicle frame for permitting the motor mount to be pivotally mounted to the frame, whereby upon pivot of the motor mount with respect to the frame the distance between the wheel rotation point on the frame and the motor rotation point on the motor changes to correspondingly change tension within the chain;
providing a chain dimensioned to maintain the motor mount pivot point offset with respect to a line between the wheel rotation point on the frame and the motor rotation point on the motor;
providing a keeper mounted to the frame for adjustably locking the keeper slot of the motor mount at a constant angle will relative to the frame pivot point to inhibit motor movement;
adjusting chain tension through pivot of the motor mount at the motor mount a pivot relative to the driven sprocket to change the distance between the driving sprocket of the motor and the driven sprocket at the wheel; and,
locking the keeper to maintain the motor mount pivot with adjusted tension on the chain.

11. The process of adjusting chain tension between the driving sprocket and the driven sprocket of a scooter according to claim 10 comprising the further steps of
maintaining the steered wheel and the driven wheel in contact with the ground while adjusting the chain tension.

* * * * *